United States Patent [19]

Garcia

[11] Patent Number: 4,698,671
[45] Date of Patent: Oct. 6, 1987

[54] PROCESS AND APPARATUS FOR GENERATING A TOMOGRAPHIC IMAGE OF A THREE DIMENSIONAL OBJECT

[75] Inventor: Edgard Garcia, Toulouse, France

[73] Assignee: Etablissement Oksman S. A. R. L., Toulouse, France

[21] Appl. No.: 737,869

[22] Filed: May 28, 1985

Related U.S. Application Data

[63] Continuation-in-part of Ser. No. 555,048, Nov. 25, 1983, abandoned.

[30] Foreign Application Priority Data

Nov. 24, 1982 [FR] France ............................ 82 19826

[51] Int. Cl.$^4$ .......................... H04N 5/32; H05G 1/64
[52] U.S. Cl. ........................................ 358/111; 378/4; 378/99
[58] Field of Search ................. 358/111; 378/99, 901, 378/2, 4, 25

[56] References Cited

U.S. PATENT DOCUMENTS 4,437,161  3/1984  Anderson ............................ 378/901
4,516,261  5/1985  Harding et al. ....................... 378/25

FOREIGN PATENT DOCUMENTS

1591807  5/1970  France .
2014749  8/1979  United Kingdom .

*Primary Examiner*—Janice A. Howell
*Attorney, Agent, or Firm*—Harold H. Dutton, JR.

[57] ABSTRACT

The invention relates to a procedure and to equipment for generating a tomographic image of a three-dimensional object in a sectional plane (P). This procedure is of the type whereby the object is irradiated at various angles of incidence by beams converging on the sectional plane (P) and by detecting the radiation that has passed through the object for each angle of incidence in order to generate an electrical image signal. In the invention, the various image signals thus generated are processed by comparing their values at each point and by selecting for each image point that signal value which corresponds to the least radiation-attenuation; the selected values provide a synthesized signal representing the tomographic image. The procedure of the invention allows obtaining a tomographic image strictly free of the blurred traces due to the points located outside the sectional plane (P).

19 Claims, 21 Drawing Figures

PROCESS AND APPARATUS FOR GENERATING A TOMOGRAPHIC IMAGE OF A THREE DIMENSIONAL OBJECT

This application is a continuation-in-part of co-pending application Ser. No. 555,048 filed Nov. 25, 1983, and now abandoned.

BACKGROUND AND OBJECTS OF THE INVENTION

The invention concerns a procedure for generating a tomographic image of a three-dimensional object in a sectional plane. It extends furthermore to improved tomographic equipment to implement this procedure.

Experts are presently well versed in tomographic technology of which the object is to provide an image of a specific sectional plane of an object. This technology is applied essentially in the medical domain to observe tissues internally at particular levels. Compared to the simple methods of radiology, tomography offers more significant images of the zone under observation with a concurrent reduction of the defects due to the other zones. This technique consists in irradiating the object at different angles of incidence, in generating for each incident angle a corresponding image signal, and in processing these various signals to synthesize the image. Conventionally this processing comprises a photographic integration in order to reproduce a sharp picture of those points which are located in the sectional plane of the various incident beams. More recently, for the last fifteen years or so, particular procedures have been developed which electrically integrate electrical-image signal (illustratively the radiological tomoscopic procedure described in the French Pat. No. 1,591,807 of May 4, 1970 [SEREL].

Whether these procedures integrate photographically or electrically, they incur the drawback of image complexity and poor densitometric resolution, whereby the images are difficult to interpret. Illustratively, while this image does include a sharp representation of the points of the sectional plane of interest, it also contains the superposition of more or less blurred curves from the other zones by the very principle of integration adding all the collected data.

Some apparatus have been designed to eliminate this drawback. The equipment described in the French Pat. No. 2,415,400 of Jan. 10, 1979 (PHILIPS) comprises several radiation sources whereby several images can be collected by a fixed receiver. These images are processed by an optical system, then by computer means, in order to reconstitute a synthesized image at a particular level. While it seems that blurring can be reduced by this method, it cannot be rigorously eliminated. Moreover, this technique is inapplicable to conventional tomographs and requires the construction of a special tomograph with several sources and with a specific optic system, explaining why presently this technique still lacks implementation.

Another method described in the French Pat. No. 2,469,739 (PHILIPS) of Nov. 5, 1980 comprises taking two photographs on one tomograph of which the source is subjected to two sweeps of different geometries (for instance circular and linear). These two photographs then are analyzed by two vide cameras in order to eliminate the shadows from the different geometries corresponding to points which are external to the sectional plane. The implementation of this method is lengthy and complex because requiring taking and developing two photographs and subsequent processing by a separate apparatus.

With regard to other types of apparatus, it is known how to process image signals fitted to the mandates of each particular application. Thus U.S. Pat. No. 4,437,161 (ANDERSON) describes an angiographic apparatus wherein, on one hand, several time-shifted images of a patient's organ are obtained following injection of contrast media from one fixed and single radiation source, and on the other hand, a differential image is processed by subtracting from each image a stored mask consisting of one of the suitably selected images. In this patent's apparatus, this differential image is compared pixel by pixel to two fixed levels in order to ascertain the applicability of the mask being used and, where called for, to store the significant received images. The comparison is solely to eliminate the spurious images (patient's motions or the as yet untriggered action of the contrast medium), but in no event do they cause a modification in the received images. The significant images then are stored and processed by subtraction in conventional manner in angiography to as to obtain a synthesized image.

However such specific processing does not resolve the problem of tomographic blurs and in no way teaches a way to a solution to the expert.

An object of the present invention is to resolve this problem by a very easily implemented and economical procedure applicable to conventional tomographs.

The object of the invention therefore is to use a conventional type tomograph to provide a tomographic image strictly free of blurred traces due to points outside the sectional plane.

Another object of the invention is to apply this procedure to the most widespread type of tomography which includes a movable source of radiation, a fixed support for the object to be examined, and oppositely, a transducer moving synchronously with the source.

In some tomographs, the various positions of the radiation source(s) during the tomographic sweep correspond to very different beam incidences and distances with respect to the photosensitive surface of the transducer. These variations in distance and angle of incidence cause substantial image perturbations because of the more than trivial radiation-attenuation factors which then intervene and which are spurious with respect to the object being examined. No known device can be rid of these defects.

Another significant object of the invention is to eliminate the effect of the variation in radiation intensities on the image due to the variations in source distance and angle of incidence with respect to the transducer.

DESCRIPTION OF THE INVENTION

The procedure which is the object of the invention for the generation of a tomographic image of an object in a sectional plane includes the following conventional stages:

(a) irradiation by at least one source of the object at different angles of incidence by means of beams converging toward the sectional plane, (b) detection by means of a transducer with a photosensitive surface and for each angle of incidence of the radiation having passed through the object in order to generate for each of said angle of incidence an electrical signal representing an image, termed the image signal, (c) and processing the various image signals corresponding to the various angles of incidence in order to emit a synthesized signal representing the tomographic image.

In the present invention, the processing (c) of the different image signals comprises:

(c1) comparing the values of these signals at each image point (c2) selecting for each image point that signal value which corresponds to the least radiation attenuation (c3) storing the selected values composing the synthesized signal representing the tomographic image (c4) and transmitting the stored signal to display means in order to display the tomographic image.

As will be more clearly understood below, such a procedure rigorously eliminates any shadow moved onto the photosensitive surface in the course of the various irradiations at different angles of incidence. This is so because the value corresponding to the least attenuation for these various angles of incidence is selected for each point, that is, the value for the most intense illumination. Thus if a shadow due to one or more angles of incidence temporarily moves on the point under consideration, it will be ignored because this point retains its maximum illumination value. On the contrary, if a shadow is stable, the level of gray of the point shall take this into account. Now the stable shadows represent the points of the sectional plane, whereas the moving shadows represent the points outside this plane. Consequently, by means of very simple processing, a sharp image of the sectional plane points is obtained, free of blurs without significance. Thereby this image gains both in spatial and in densitometric resolution.

The processing can be implemented directly on the detected image signals. In that case, (c1) The value of the image signals is compared directly after detection (c2) and the value corresponding to the maximal detected radiation intensity is selected for each image point.

As a rule, the detection (b) of the radiation for each incidence generates an image signal of which the value at each point is directly related to the received radiation intensity. It suffices than to select (c2) for each image point the maximal value of the various image signals. The simplicity of such processing speaks for itself.

In another implementing mode to compensate the effects in variation of distance and angles of incidence of the source with respect to the photosensitive surface:

(c0) The image signals are corrected before being compared (c1) by modifying the values at each image point as a function of the variations in distance and angle of incidence of the irradiation, (c1) the various corrected image signals are compared at each image point (c2) the maximal corrected value is selected at each image point.

This implementing mode offers a particularly sharp image of the sectional plane due to the elimination of the inherent defects in the displacement of the source with respect to the object. This correction was found to be of capital significance for certain very widespread types of tomographs.

Where called for, the implementing equipment may be provided with a selector for bypassing or not the correction mechanism.

The processing of the invention is applicable to any conventional tomograph because not requiring any architectural changes in such: it is enough to provide the tomograph with image acquisition means (generally already provided) and with fitted processing means.

Accordingly the invention applies to improved tomographic equipment of the conventional type which includes a stand supporting a movable radiation source, a support for the object being examined and a transducer moving in synchronism with the source, where this transducer is provided with a photosensitive surface and designed to convert the received radiation into electrical image signals in order to generate an image on display means. In the present invention, this equipment is provided with:

an analog/digital converter designed to sequentially receive the image signals from the transducer and designed to transmit a digital image signal to each sequence, storage means designed to receive at their input at each sequence the digital image signal transmitted by the converter, the storage means being provided with a write-in control and designed to store the values of pixel selected as a function of the state of the write-in command, comparator means designed to receive for each sequence on one hand a signal corresponding to the digital image signal from the converter and on the other hand the signal contained in the storage means, the comparator means being designed to provide at their output and for each pixel pair of the same address one comparison bit which depends on the relative values of these pixels, the output of the comparator means being connected to the write-in control of the storage means in order to implement or to inhibit, pixel by pixel, the storage of the pixel values which are present at the input of said storage means, a drive oscillator and an address generator designed to control the converter and the storage means.

DESCRIPTION OF THE DRAWINGS

Other features, purposes and advantages of the invention shall become clearer from the description to follow in relation to the attached drawings illustrating an embodiment of the equipment of the invention and an implementing mode of the procedure.

DESCRIPTION OF PREFERRED EMBODIMENTS

Figure 1:
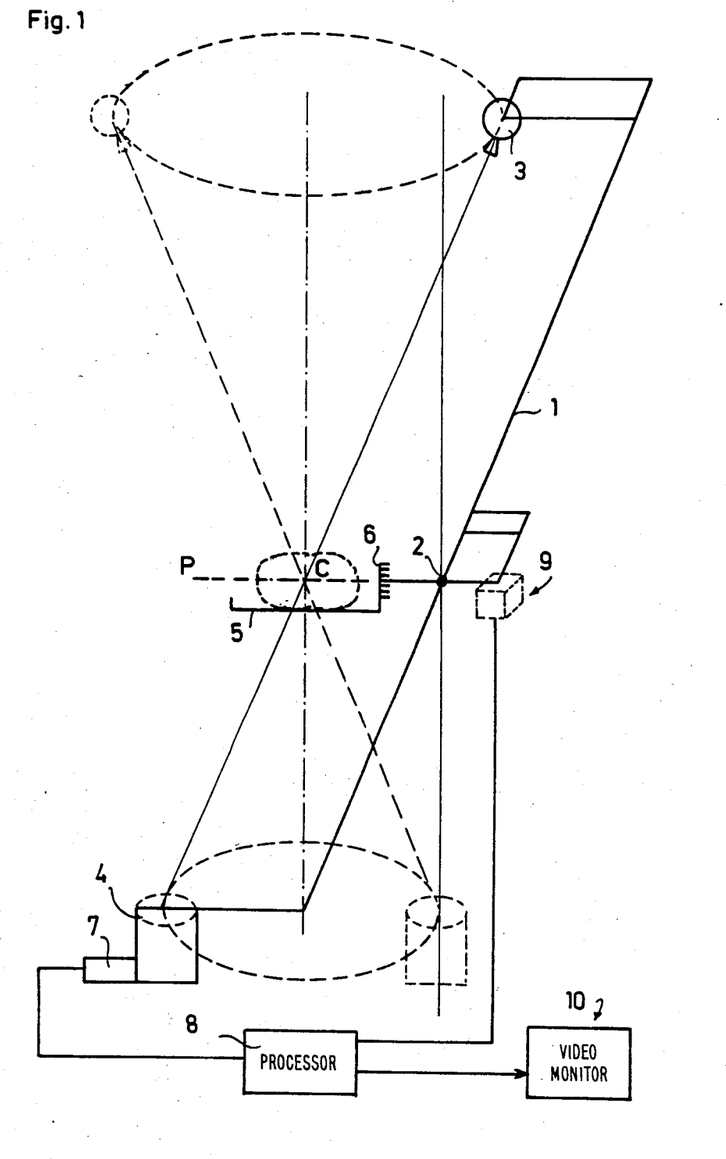
FIG. 1 is a schematic of a conventional tomograph provided with processing means of the invention.

The schematically and illustratively shown tomograph of FIG. 1 is a conventional type. It includes a tomographic stand equipped with an arm 1 pivoting about a hinge point 2 and bearing:

at one of its ends a radiographic radiation source 3 (X-ray tube), at the opposite end a transducer (4, 7) with a photosensitive surface which in this example consists of the photosensitive surface of a light-intensity amplifier 4 adapted to radiological purposes, a patient support 5 at the level of its hinge.

The support 5 is stationary during the tomographic sweep and can be previously adjusted in height with respect to the hinge point 2 by a conventional mechanical system symbolically denoted by 6.

The radiation source 3 is permanently pointed toward the photosensitive surface of the light-intensity amplifier 4. This photosensitive surface remains parallel to a given plane which as a rule is horizontal and is constantly centered on the source beam axis. The source sweep generated by rotating the arm 1 can be carried out along different itineraries depending on the tomograph involved (with the photosensitive surface moving in synchronization with the source). In FIG. 1, a circular sweep is illustratively shown; during this sweep, the source may be activated either continuously or in pulses.

During the sweep, the successive beams irradiating the object subtend different angles of incidence and all converge at a point C of the sectional plane. It should be noted that this "sectional plane" may be a surface other than plane depending on the shape of the photosensitive surface; however this expression "sectional plane" is retained with the understanding it must be construed in its broader sense.

No further details will be provided regarding the overall architecture of this type of tomograph, which is conventional (type "Polytome" PHILIPS tomograph).

The light-intensity amplifier 4 is connected to a video camera 7 emitting video image signals which correspond to the image transmitted by the amplifier. In the case of a pulsed radiation mode, the camera emits a video image signal for each different angle of incidence of radiation start. As regards a continuous radiation mode, based on the changing image transmitted by the amplifier 4, the camera emits a sequence of video images at a frequency depending on its acquisition time: In this event only those images obtained (and in fact other than static) which correspond to discrete radiation incidences and sampled at the acquisition frequency shall be considered.

The successive video images corresponding to the various angles of incidences are fed to processing means 88 for which a preferred embodiment is described further below.

These processing means 8 receive a position signal generated by means 9 measuring the relative position of the radiation source 3 and of the transducer (4,7). These measurement means are conventional per se (and already provided on some tomographs) and are associated with the arm 1. They provide ordinate and abscissa coordinate positions which are a function of the angular position of this arm in this space (the signals thereby defining the relative positions of source and transducer). The measuring means 9 may be of the double-potentiometer type actuated by a "broomstick" ganged to a deforming parallelogram mounted on the arm 1.

The processing means feed a synthesized signal to a video monitor 10 whereby the corresponding synthesized image can be visualized.

As shown in greater detail below, the processing means 18 are designed to compare the values of the various signals (whether corrected or not) point by point and to select for each point the maximum value and to store this value in order to form the synthesized signal fed to the monitor.

The schematics of FIGS. 2a and 2b through 2e illustrate this procedure and the results so obtained.

There are two absorbing points A and B in the object being examined, with A being located in the sectional plane while B is outside same. These points are irradiated at different angles of incidence (three angels of incidence are diagrammatically shown in FIG. 2a: $R_1$, $R_2$, $R_3$).

Figure 2A:
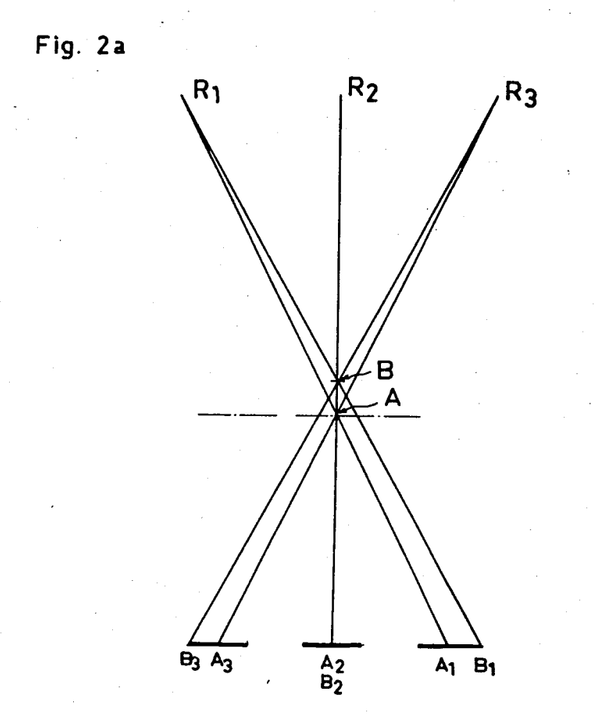
FIGS. 2a, 2b, 2c, 2d, 2e, 2f are schematics illustrating the concept implemented by the procedure of the invention.
Figure 2B:
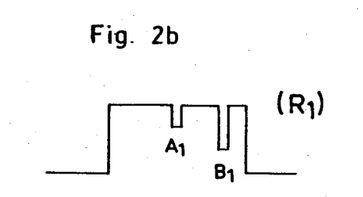

For radiation $R_1$, an image signal symbolically shown in FIG. 2b is obtained, where the projections A and B cause separate shadows which are functions of the respective attenuations of the points A and B (it is assumed that the point B, which is outside the sectional plane, absorbs more and causes a more marked shadow).

Figure 2C:
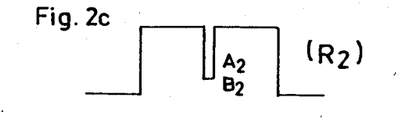

As regards radiation $R_2$, the points A and B cause coinciding shadows (the attenuation being directly related to the sum of the attenuation (FIG. 2c).

Figure 2D:
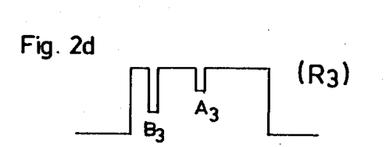

As regards the radiation $R_3$, the shadow of point B has been moved further whereas that of point A has kept the same position on the photosensitive surface of the light-intensity amplifier (FIG. 2d).

Therefore the processing which comprises selecting at each point the maximum illumination level (least radiation attentuation) results in:

keeping the maximum level of the three image signals at each image point (or pixel corresponding to $B_1$, hence in eliminating the shadow $B_1$, keeping the maximum level of the three image signals for the pixel corresponding to $A_1$, $A_2$-$B_2$ or $A_3$, hence in keeping the level of $A_1$ or of $A_3$.

keeping the maximum level of the three image signals for the pixel corresponding to $B_3$, hence in eliminating the shadow $B_3$.

Figure 2E:
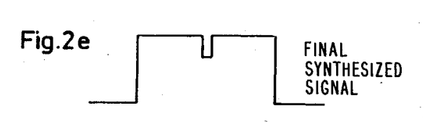
Figure 2F:
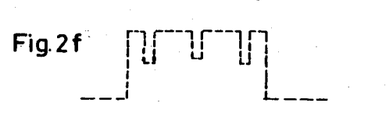

Accordingly the synthesizing image signal illustrated in FIG. 2e solely comprises the shadow of the point A located in the sectional plane with a level of gray that is genuinely significant: the motion shadows of the point B located outside the sectional plane are eliminated (in this example, as these shadows are more intense than those of the sectional plane, the integrated image obtained in conventional manner would be next to impossible to interpret. This integrated image is symbolically shown in dahsed lines in FIG. 2f).

Figure 3:
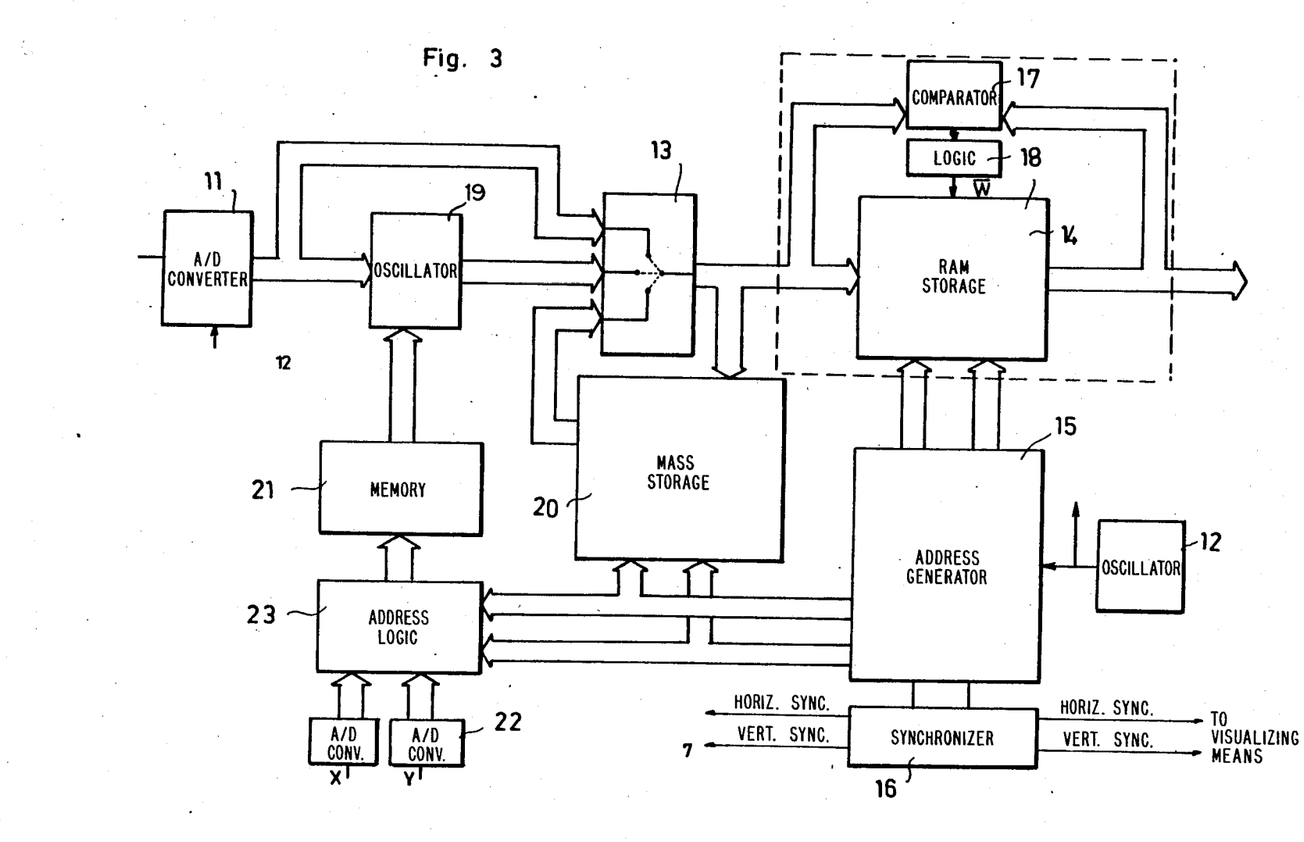
FIG. 3 is a block diagram of the processing means of the equipment of the invention.

FIG. 3 is a block-circuit diagram of an embodiment mode of the processing means 8 object of the invention.

The analogue video signal transmitted from the camera 7 is fed to an analogue digital converter 11. This converter is controlled by a drive oscillator 12 and is of the "flash converter" type, capable of sequentially receiving the video image signals and transmitting for each sequence a corresponding digital image signal. The analogue video signal from the camera is sampled at the frequency of the drive oscillator and the converter defines the discrete image points (pixels) and generates the digital image signals, each formed by a succession of words representing the succession of the pixel values. Each digital image signal from the converter 11 is transmitted directly or in a corrected form by means of a selector 13 to storage means 14 consisting of a random-access memory provided with a write-in control W and having a capacity designed to store the various constituent words of a digital image signal. In conventional manner the memory 14 is controlled by an address generator 15 driven by the drive oscillator 12.

The output of the generator 15 are address bits in a predetermined sequence and used to control a camera synchronizing circuit 16 which generated horizontal and vertical synchronizing signals compatible with the video camera used to control its sweep in synchronization with the address generator. These synchronizing generators also may be used to control the sweep of the TV monitor 10.

Comparator means 17 of which the inputs are connected to the input and output of the memory 14 for each sequence receive on one hand the signal corresponding to the digital image signal (the digital image signal itself or the corrected digital image signal), and on the other hand the signal contained in the memory 14.

These comparator means 17 compare these signals pixel by pixel and are designed to emit at their output and for each pixel pair from the same address a comparison bit which is a function of the respective values of these pixels. This comparison bit is fed through a verifying logic 18 to the write-in control W of the memory 14. The logic 18 validates the write order of the comparator means 17 at the suitable instants of each sequence and includes initialization means to erase previous to each tomographic sequence the contents of memory 14.

The comparison bits are processed by the comparison means 17 in such a manner that:
  there is a write-in into the memory 14 when value of the pixel present at the memory input exceeds the value of the pixel from the same address stored in the memory 14 and present at the output of this memory,
  any write-in is inhibited otherwise.

Accordingly the comparator means 17 and the random access memory 14 perform comparisons and successive selections in real time with respect to the different digital signals emitted by the converter:
  comparison of the first two image signals,
  generating and storing an intermediate synthesized signal by selecting for each image point the value of that of the two signals which corresponds to the least attenuation,
  comparison of this intermediate synthesized signal with another image signal to generate by a similar selection a new intermediate synthesized signal,
  and renewing these operations between the new intermediate synthesized signal and another image signal for all the image signals, the comparison being carried out at each stage between the relevant image signal and the intermediate synthesized signal emitted from the previous comparison.

Figure 4:
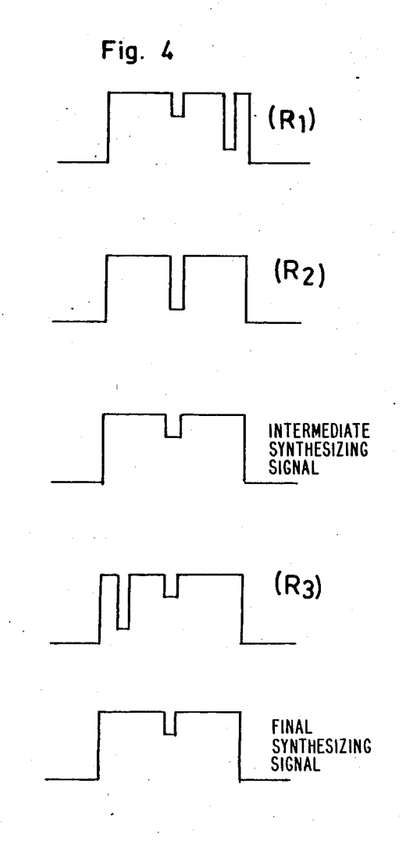
FIG. 4 is a plot showing an implementing mode of the procedure by successive selections and comparison.

FIG. 4 illustrates the comparisons and the successive selections in the case of the three radiations of FIG. 2a; the pairwise comparisons of the signals result in the final synthesized signal already mentioned.

Furthermore the output from the random acess memory 14 is connected to the TV monitor 10 by an adapting interface of which an illustrative embodiment shall be described further below. At the end of the tomographic sweep, the final synthesized image will be displayed on this monitor.

In the example shown the selector 13 is provided with three input buses (FIG. 3), of which one is connected directly to the converter 11, another to a correction multiplier 19, and lastly the third is connected to a mass storage 20 which were called for allows operating in delayed time. The selector may be manually controlled or programmable in order to select one of the three operational modes: operation in real time without correction, operation in real time with correction, and operation in delayed time.

At its inputs, the multiplier 19 receives on one hand the digital image signal emitted by the converter 11, and on the other hand correction coefficients stored in a memory 21 containing the tables $T_1$, $T_2$, ... of the correction coefficients; the computation and the loading of the correction coefficients into the memory 21 are described further below.

The selection of the correction-coefficients table is carried for each sequence (corresponding to a given angle of incidence) by means of an interface between the tomograph measuring means 9 and the memory 21. This interface includes analogue-digital conversion means 22 for the position signals emitted by the measuring means 9 and address logic 23 designed to feed to the memory 21 addresses which are a function of the measured positions. Moreover this logic allows selecting inside each table the correction coefficient corresponding to the point under consideration by providing the address of this coefficient in the particular table as a function of the relevant pixel.

The multiplier 19 receives the correction coefficient selected in the memory for each pixel and performs the multiplication of the pixel value provided by the converter 11 by this coefficient and further feeds the result to the selector 13.

Figure 5:
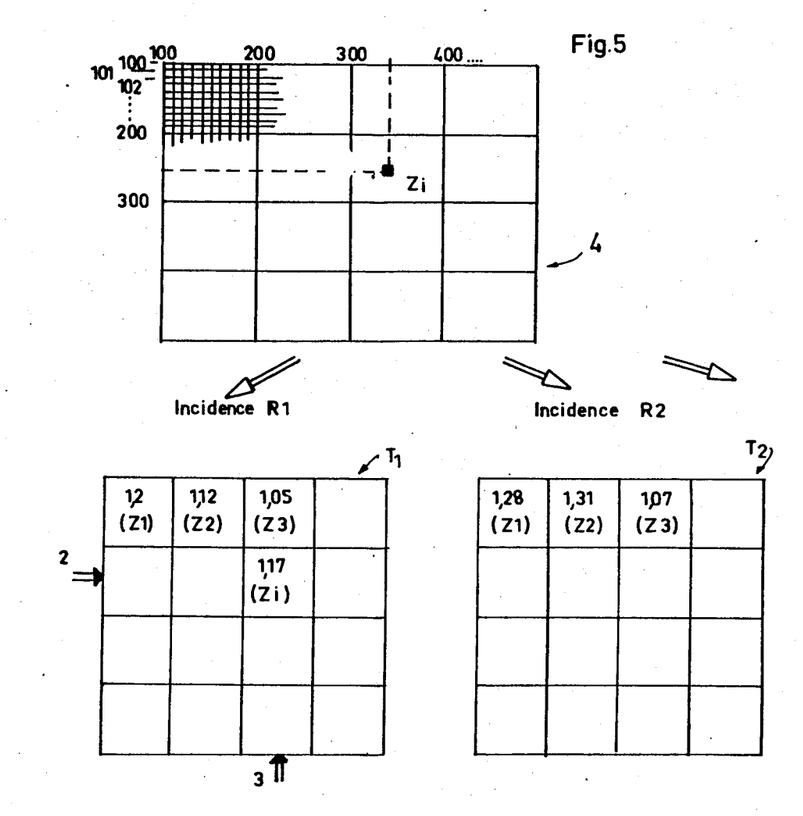
FIG. 5 is symbolic diagram illustrating the correction process.

The photosensitive surface of the transducer 4 is fictitiously divided into a plurality of elementary zones $Z_1$, $Z_2$, $Z_3$ ... as symbolically shown in FIG. 5. Each correction table $T_1$, $T_2$ ... corresponds to a given angle of incidence $R_1$, $R_2$, ... and contains a matrix of correction coefficients equal in number to the number of elementary zones $Z_1$, $Z_2$, $Z_3$ ... Therefore all the pixels from the same elementary zone will be assigned the same correction coefficient. During the tomographic sweep, the table is selected as a function of the angle of incidence of the radiation in progress thanks to the coordinates provided by the measuring means. Thereupon the table coefficient is selected directly within this table from the address of the pixel being processed.

As all the zones $Z_1$, $Z_2$, $Z_3$, ... are identical, such addressing can be carried out in simple manner by retaining the address part corresponding to the relevant elementary zone in the full address of the pixel.

The correction coefficients are determined in such a manner as to compensate the variations in the intensity of the detected radiation that are caused by variations in distance and in angles of incidence of the irradiation. These coefficients can be computed theoretically for each angle of incidence and for each elementary zone by taking into account the average angle of incidence and distance for the pertinent zone. However it is simpler and more practical to perform a prior calibration which comprises:
  irradiating at the diverse angles of incidence the photosensitive surface 4 while the object is absent
  storing the values of the detected image signals in particular in the auxiliary buffer memory of a computer (omitted),
  and using these values to calculate the correction-coefficient tables, each coefficient being inversely related to the average value of an image signal in the corresponding elementary zone.

This calibration is carried out once and for all on the site, after the equipment has been installed, the computer may be a unit integrated into the equipment or an auxiliary calculator connected to it.

The calculation can be carried out by taking as the reference value the average signal value of the central zone of the photosensitive surface when the radiation source is axially located with respect to the vertical of the center of the photosensitive surface; this reference value is assigned the value 1. The other coefficients than are obtained from the reciprocal of the average value measured in the absence of the object in each elementary zone regardless of the angle of incidence (that is, for all the tables).

In the case of a large number of angles of incidence whether for continuous or pulsed radiation, preferable the prior calibration is performed by selecting a limited number of angles of incidence from the set of them, by irradiating the detection surface in the absence of the object for these selected angles of incidences, by storing the values of the detected image signal, by calculating the correction coefficients corresponding to these signals (according to the above mentioned process), and by extrapolating these calculations to the other angles of incidence in order to obtain the corresponding correction coefficients. As a result the lacking tales for the non-selected angles of incidence can thus be set up and stored.

Illustratively and for the case of a source with a circular itinerary, it is possible to calibrate by selecting solely two diametrically opposite angles of incidence, the tables corresponding to the other angles of incidence being deduced by the computation of matrix rotation.

The response-times of the various constituents assemblies (converter, multiplier, selector, memories, comparator, verifying logic . . . ) are cumulative and may be incompatible with high sampling frequencies of the image signal.

To overcome this problem, demultiplexing means are arranged at the output of the converter 11 in order to set up n parallel treatment channels; the memory 14 then is divided into n sub-sets and the comparison means 17 into n comparators each associated with a verifying logic 18 and assigned to one memory sub-set.

Figure 6A:
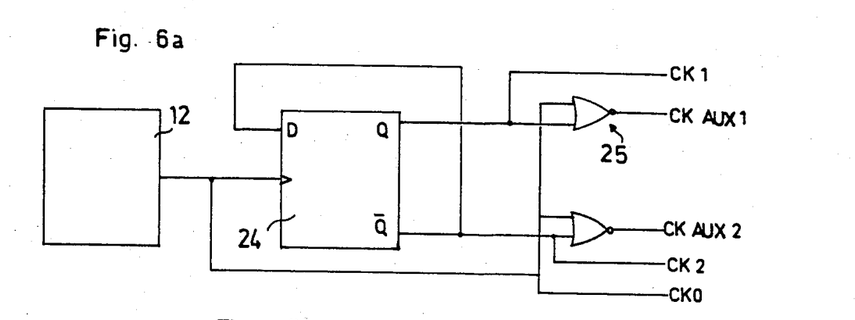
FIGS. 6a, 7a, 8a, 9 are detail diagrams of subassemblies of the equipment which allow operation in several parallel channels.
Figures 7A, 7B:
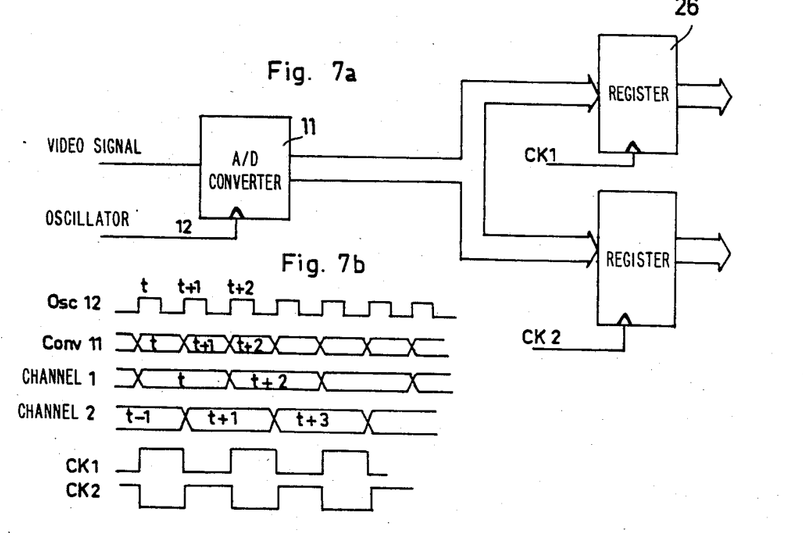
Figure 8A:
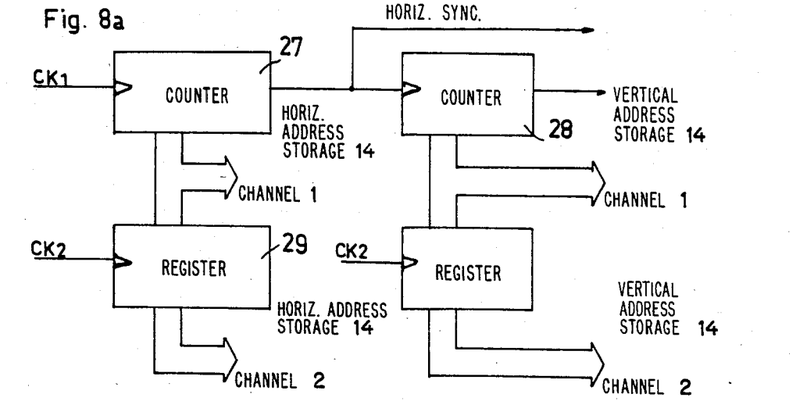
Figure 9:
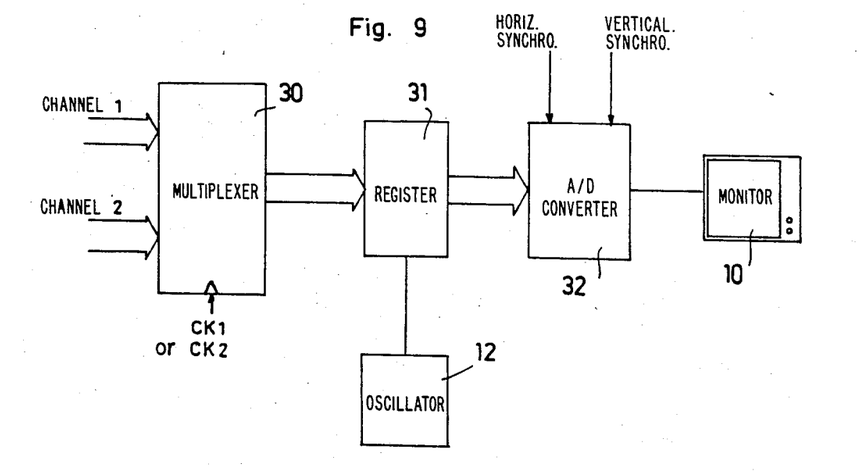

These demultiplexing means in the Example shown in FIGS. 6a, 7a, 8a, 9 include:
  means for generating clock and control signals for each processing channel, these means being symbolized in FIG. 6a,
  demultiplexing means, shown in FIG. 7a, for the data addressing means for the n sub-sets of the random access memory 14 and symbolized in FIG. 8a,
  and data multiplexing means, symbolized by FIG. 9, to reconstitute the final synthesized signal.

The object of FIGS. 6–9 are two processing channels (the case for processing with a higher number of channels can be carried out by the same principle).

Figure 6B:
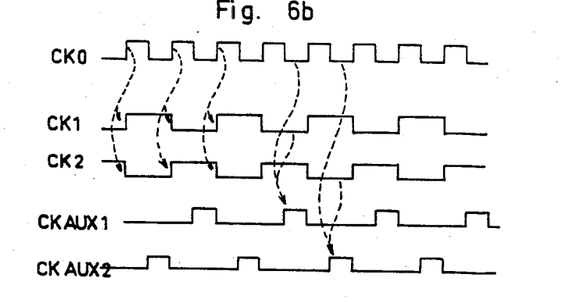
FIGS. 6b, 7b, 8b are time-plots relating respectively to FIGS. 6a, 7a and 8a, FIG. 10 is a partial block diagram of one equipment mode of implementation.

The drive oscillator 12 emits a signal CKo at the base frequency controlling the converter 11 (this signal is symbolized in FIG. 6b).

A divider 24 associated with an auxiliary logic 25 (FIG. 6a) generates:
  two complementary signals $CK_1$ and $CK_2$ of divided frequency (in the example shown in these Figures, divided by a factor of 2)
  and auxiliary signals $CK_{AUX1}$ and $CK_{AUX2}$ comprising positive pulses at the ends of the respective cycles $CK_1$ and $CK_2$.

The complementary signals $CK_1$ $CK_2$ shall be the clock signals for each processing channel. The signals $CK_{AUX1}$ and $CK_{AUX2}$ shall validate the write-in command in each sub-set of the random access memory 14.

It must be well understood that when there is a number n larger than 2 of channels, the frequency shall be divided by this number n, the divider 24 and its auxiliary logic 25 being fitted to this number of channels.

The demultiplexing means schematically and illustratively shown in FIG. 7a include n type D registers such as 26 which are arranged in parallel at the output of the converter 11. These registers store the values at their inputs on the rising slope of the clock signals $CK_1$, $CK_2$ of the particular channel.

FIG. 7b is a time plot for the case of two channels.

FIG. 8a is a block diagram of the address generator operating in multiplexed channels. It includes 2 sets of counters such as 27 and 28 which generate:
  directly the addressing of a random-access memory sub-set,
  and the addressing of the sub-set of the other channel by means of a type D 29 register synchronized by the signal $CK_2$ of the corresponding channel.

Figure 8B:
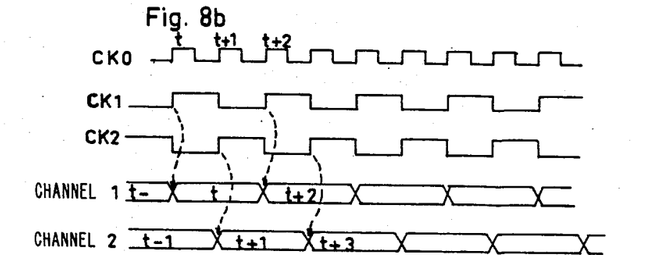

FIG. 8b is a time-plot of this address generation by multiplexed channels.

FIG. 9 shows the multiplexing means 30 at the output of the sub-sets of the random access memory 14 for the reconstitution of the final synthesized signal. These means consist of a multiplexer connected to the outputs of the various sub-sets of the memory 14 and controlled in the case of this example of 2 channels by the signals $CK_1$ or $CK_2$.

This multiplexer acts on the TV monitor 10 through a display interface which includes:
  a type D 31 register driven by the oscillator 12 for the purpose of obtaining a signal unaffected by the multiplexer response time,
  and a digital-analogue converter 32 receiving the synchronizing signals and data in order to reconstitute a composite video signal suitable for the TV monitor 10.

Figure 10:
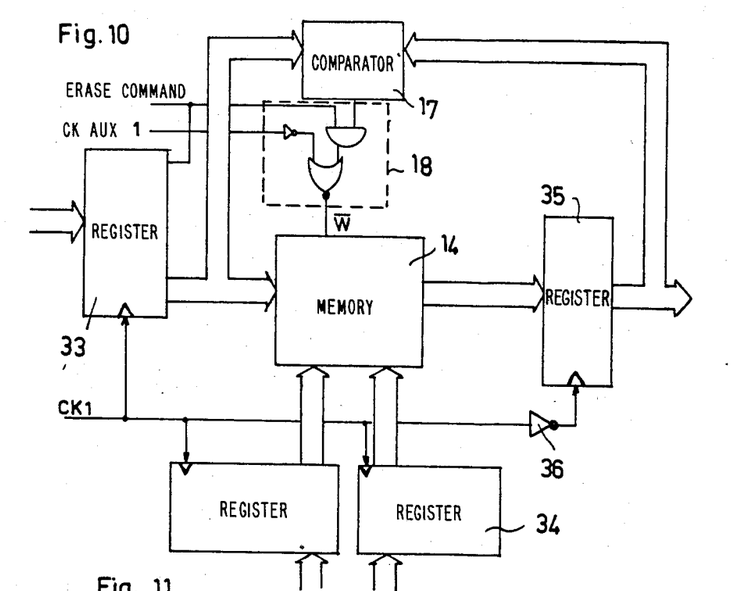

FIG. 10 shows an embodiment mode of the assembly consisting of the comparator 17, logic 18 and memory 14 (framed by dashed lines in FIG. 3). This configuration applies to all the processing channels where several channels are used.

At the output of the selector 13, the data are time-shifted by type D 33 register in order to synchronize these incoming data with the incoming addresses which themselves are similarly shifted by registers 34 at the output of the address generator 15.

At the output of the memory 14, a type D 35 register controlled by the clock signal through an inverter 36 feeds the memory output data to one of the inputs of the comparator 17.

The verifying logic 18 comprises an inverting gate, an AND gate and an OR gate, and receives an external erase command to initialize. This external erase command also is connected to a zero-reset input of the register 33. This command, which may be manual, thus constrains write-in into the entire random access memory 14 of data which are reset to zero and which are contained in the register 33. Furthermore, the drive of the OR gate by a signal synchronized with the clock of the relevant channel validates the comparison signal at an appropriate instant at the end of cycle (where the comparison is significant, as shown by FIG. 11).

Figure 11:
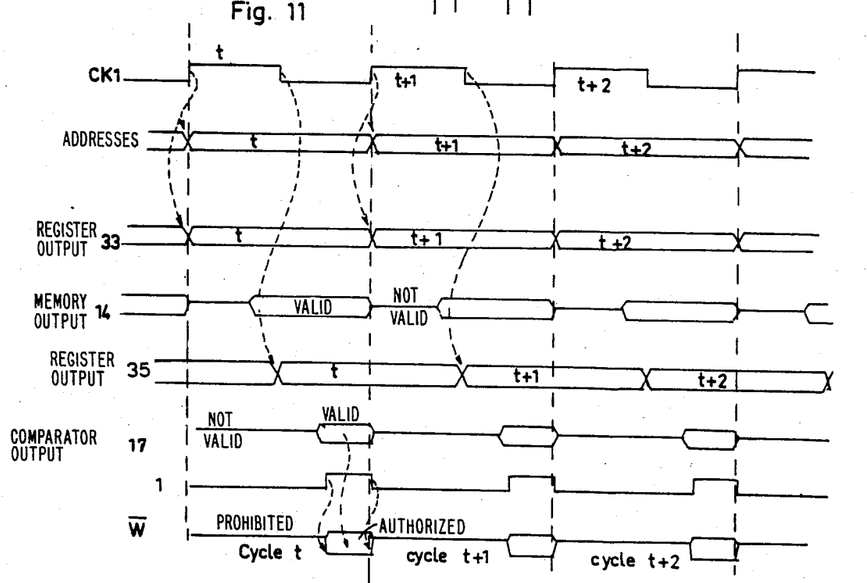
FIG. 11 is a time-plot illustrating the operation of the embodiment of FIG. 10.

This FIG. 11 is a time-plot relating to an embodiment mode of FIG. 10.

Figure 12:
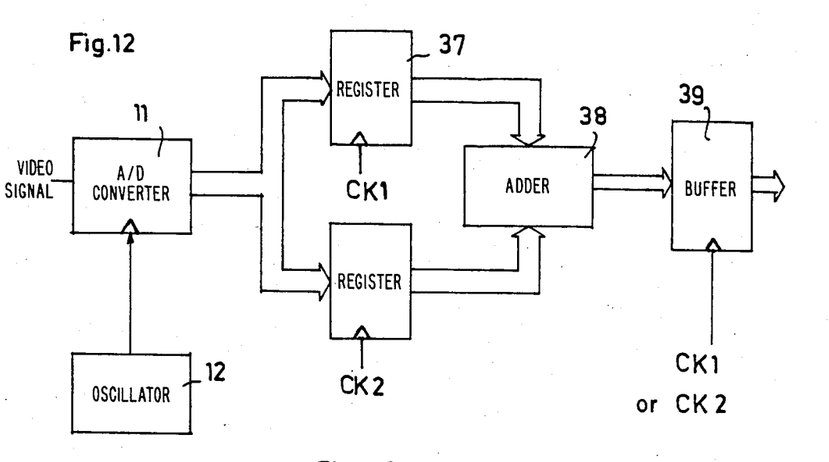
FIG. 12 is a partial block-diagram of a multiple-sampling embodiment mode.

Moreover the FIG. 12 partly shows an embodiment mode wherein the video input analog signal is sampled at a frequency which is a multiple of the digital image signal in order to achieve a more faithful digital conversion.

In this case, the oscillator 12 is adapted to emit a sampling-command signal of a frequency a multiple of the base frequency; the converter 11 itself is designed to respond to this higher frequency. This converter is connected at its output to temporary-storage registers such as 37 which are arranged in parallel and controlled in a manner similar to that of the registers 26 of FIG. 7a by means of a divider associated to the drive oscillator (this divider is similar to the divider 24 of FIG. 6a).

At their outputs the registers 37 are connected to an adder 38. The output of this adder is connected to a buffer memory register 39 controlled by the above-mentioned divider.

The words of the digital image signal which are present at the output of the register 39 are a digital representation of higher fidelity than in the case of a conversion sampled at the base frequency.

Figure 13:
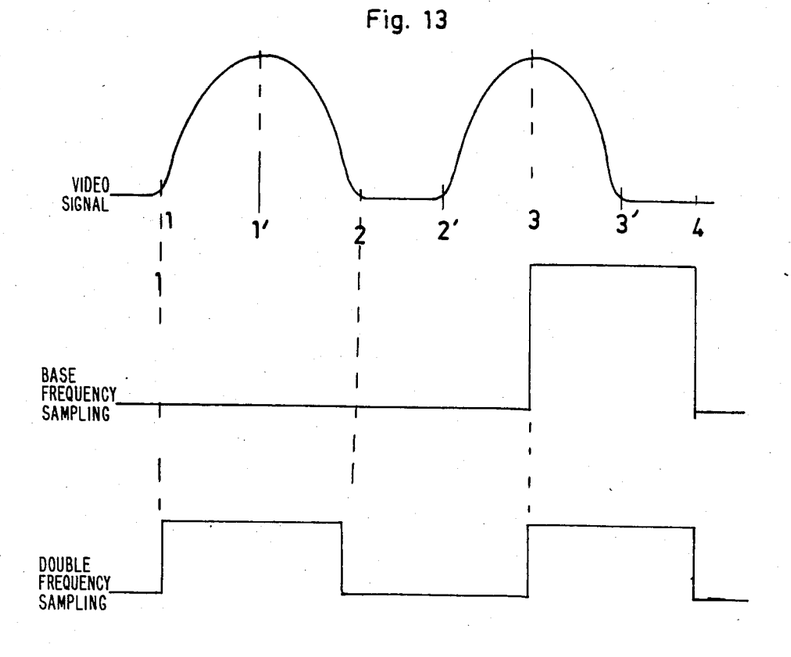
FIG. 13 is a diagram explaining the result from the multiple-sampling embodiment.

FIG. 13 is a time-plot of this result in the case of sampling at double the frequency. The first signal symbolically shown in this Figure is an example of an analogue video signal comprising frequencies close to the base frequency. The second signal symbolized the digital signal sampled at the base frequency. It is clear that the first waveshape is not reconstituted. The third signal symbolizes the digital signal sampled at double the base frequency. The average value of the sampled pairs of values therefore reflects the two waveshapes.

I claim:

1. A process for generating a tomographic image of a three-dimensional object in a sectional plane (P) comprising:
    irradiating the object at various angles of incidence ($R_1$, $R_2$, ...) by means of beams converging toward the sectional plane using at least one radiation source (3);
    detecting for each angle of incidence, and by means of a transducer (4, 7) having a photosensitive surface, the radiation passed through the object for generating for each of said angles of incidence an electric signal representing an image signal, and
    processing the various image signals corresponding to the various angles of incidence for the purpose of emitting a synthesized signal representing the tomographic image, said processing step comprising comparing the values of the different image signals at each image point, selecting the image signal value corresponding to the least radiation attenuation for each image point, storing the selected values comprising the synthesized signal representing the tomographic image, and feeding the stored signal to display means (10) for visualizing the tomographic image.

2. A process as in claim 1, and including comparing the values of the image signals directly following detection and selecting the value corresponding to the maximum detected radiation intensity for each image point.

3. A process as in claim 2, and including carrying out the radiation detection step for each angle of incidence in such a manner as to generate an image signal of which the value at each point is directly related to the received radiation intensity, and selecting the maximum value of the various image signals for each image point.

4. A process as in claim 1, and including correcting said the image signals prior to their comparison by modifying their values at each image point in such a manner as to compensate intensity variations in the detected radiation caused by variations in distance and in the angle of incidence of the irradiation,
    comparing the various corrected image signals at each image point, and
    selecting the maximum corrected value at each image point.

5. A process as in claim 4, and including carrying out the image signal correcting step by providing the photosensitive surface of the transducer (4, 7) with a plurality of elementary zones ($Z_1$, $Z_2$, $Z_3$, ...),
    performing a prior calibration comprising
        irradiating the detection surface in the absence of an object at different angles of incidence,
        storing the values of the detected image signals, and
        calculating correction coefficient tables ($T_1$, $T_2$ ...) each corresponding to one angle of incidence ($R_1$, $R_2$, ...), each correction coefficient being inversely related to the average value of an image signal of one of the elementary zones, and
    multiplying at each image point the value of each detected image signal corresponding to a specific angle of incidence by the correction coefficient of the corresponding table, where said correction coefficient relates to the zone in which is located the image point under consideration.

6. A process as in claim 5 and including carrying out said calibration step by selecting a limited number of angles of incidence from the set of angles of incidence, irradiating the detection surface in the absence of the object at the selected angles of incidence, storing the values of the detected image signals, and calculating a number of tables corresponding to the total number of angles of incidence by extrapolating for the angles of incidence not selected.

7. A process as in claim 1 and including carrying out the image signal comparison step and the image signal value selecting step in real time by successive comparisons and selections comprising (a) comparing the first two image signals, (b) generating and storing a first intermediate synthesized signal by selecting at each image point that value of the two signals which corresponds to the least attenuation, (c) comparing said first intermediate synthesized signal with another image signal for generating by a similar selection a second intermediate synthesized signal, and (d) repeating steps (a) through (c) between said second intermediate synthesized signal and another image signal for all of said image signals at each stage between the pertinent image signal and the intermediate synthesized signal obtained from the previous comparison.

8. A process as in claim 7 and wherein the detection is combined with analogue-digital conversion sampled at a frequency specified for defining the image points (pixels) for the purpose of generating digital image signals formed by a succession of words representing the succession of pixel values, the pairwise comparison of the image signals and the intermediate synthesized signals being carried out pixel by pixel in such a manner as to preserve the pixel value corresponding to the least radiation attenuation.

9. A process as in claim 1 and wherein said irradiation step is performed by a single radiation source (3) moved with respect to the sectional plane so as to provide successive beams with different axes of incidence ($R_1$, $R_2$) converging at a point (C) of the sectional plane (P), and wherein said detecting step is performed with the radiation source so that the photosensitive surface of said transducer is constantly centered on the beam.

10. An apparatus for generating a tomographic image comprising a tomographic stand (1) bearing a movable radiation source (3), a support (5) for the object to be examined and a movable transducer (4, 7) capable of being displaced in synchronization with said source, said transducer having a photosensitive surface and being designed to emit electrical image signals as a function of the received radiation for generating an image on display means (10), said apparatus further including an analog-digital converter (11) for sequentially receiving the image signals emitted from the transducer and for transmitting a digital image signal for each sequence, storage means (14) for receiving at its input and at each sequence the digital image signal transmitted by said converter, said storage means being provided with a write-in control (W) and being designed to store the values of selected pixels as a function of the state of the write-in command, comparator means (17) for receiving at each sequence a signal corresponding to the digital image signal transmitted by the converter and the signal contained in the storage means, said comparator means providing at its output and for each pixel pair from the same address a comparison bit as a function of the relative values of these pixels, the output of said comparator means being connected to said write-in control (W) of said storage means for generating or inhibiting pixel by pixel the storage of the values of the pixels which are present at the input of said storage means, and a drive oscillator (12) and an address generator (15) for controlling said converter (11) and said storage means (14).

11. An apparatus as in claim 10 and including means (9) for measuring the relative positions of said radiation source (3) and said transducer (4, 7) and for emitting a position signal, memory means (21) for storing tables of correction coefficients, an interface (22, 23) between said measuring means and said memory means for transmitting to said memory means addresses as functions of the measured positions, multiplier means (19) for receiving for each sequence the digital image signal transmitted by said converter (11) and the contents selected from said memory means (21) and for providing to said comparator means (17) a corrected digital image signal.

12. An apparatus as in claim 11 and wherein said comparator means (17) has an input connected to said converter (11) and to said multiplier (19) by means of a selector (13) for guiding either the digital image signal or the corrected digital image signal toward said comparator means.

13. An apparatus as in claim 10 and wherein said comparator means provides at its output a write command bit when the pixel value from said memory means (14) is less than the value of the other pixel from the converter (11) or from the multiplier means (19).

14. An apparatus as in claim 10 and wherein said memory means (14) comprises a random access memory for storing the constituent bits of a digital image signal.

15. An apparatus as in claim 10 and including demultiplexing means (24–29) at the output of said converter (11) for creating n parallel processing channels.

16. An apparatus as in claim 10 and wherein said drive oscillator assures a sampling control of said converter (11) at a frequency which is a multiple of the frequency of said digital image signal, said converter means having an output connected to temporary storage registers (37) in parallel configuration, said drive oscillator (12) being associated with a divider for assuring the successive control of said registers (37) at the frequency of the digital image signal, said storage registers (37) having outputs connected to an adder (38) and said adder (38) having an output connected to a buffer storage register (39) controlled by a divider for successively transmitting the words of the digital image signal.

17. An apparatus as in claim 10 and including initializing means (18) for erasing the contents of the storage means (14) prior to each tomographic sequence.

18. An apparatus as in claim 10 and wherein said transducer includes a light intensity amplifier (4) and a video camera receiving the output from said amplifier for emitting a video signal image, said drive oscillator (12) and said address generator (15) being configured to control the synchronization of the video camera for synchronizing the video image signal with said address generator (15).

19. An apparatus as in claim 18 and wherein said address generator includes counters (27, 28) connected to said drive oscillator (12) for transmitting at address bits in a predetermined sequence, and a camera synchronizing circuit for receiving said address bits for transmitting horizontal and vertical synchronizing signals controlling the sweep of the video camera (7).

* * * * *